United States Patent [19]

Hirota et al.

[11] Patent Number: 5,637,052
[45] Date of Patent: Jun. 10, 1997

[54] CONTROL SYSTEM FOR MOTOR VEHICLES EQUIPPED WITH A TORQUE CONVERTER AND A LOCK-UP CLUTCH

[75] Inventors: Toshiaki Hirota; Hisashi Igarashi; Yoshiharu Saito; Jun Takahashi; Akira Kato; Toru Kitamura, all of Saitama-ken, Japan

[73] Assignee: Honda Giken Kogyo Kabushiki Kaisha, Tokyo, Japan

[21] Appl. No.: 577,938

[22] Filed: Dec. 22, 1995

[30] Foreign Application Priority Data

Dec. 26, 1994  [JP]  Japan ..................... 6-338031

[51] Int. Cl.⁶ ........................................... F16H 59/14
[52] U.S. Cl. ................ 477/61; 477/77; 477/111; 477/181
[58] Field of Search ................ 477/53, 54, 62, 477/77, 78, 111, 121, 181, 64, 65, 58, 61

[56] References Cited

U.S. PATENT DOCUMENTS 4,905,544  3/1990  Ganoung ..................... 477/62
5,274,553  12/1993  Boardman ..................... 477/78

FOREIGN PATENT DOCUMENTS 5-262169  10/1993  Japan.

*Primary Examiner*—Andrea L. Pitts
*Assistant Examiner*—Sherry Lynn Estremsky
*Attorney, Agent, or Firm*—Nikaido, Marmelstein, Murray & Oram LLP

[57] ABSTRACT

In a control system for controlling motor vehicles in such a manner that the drive force of the vehicle is determined by the accelerator pedal stroke and the vehicle speed, the fuel consumption is minimized by appropriately selecting the gear ratio of the power transmission system under each current operating condition. In particular, the present invention accounts for the slip ratio of the lock-up clutch as well as the transmission efficiency of the torque converter by noting the fact that the lock-up clutch operates under semi-tight conditions as well as under tight and loose conditions.

6 Claims, 7 Drawing Sheets

CONTROL SYSTEM FOR MOTOR VEHICLES EQUIPPED WITH A TORQUE CONVERTER AND A LOCK-UP CLUTCH

TECHNICAL FIELD

The present invention relates to a control system for motor vehicles, and in particular to a control system for controlling motor vehicles equipped with a power transmission system combining a torque converter and a lock-up clutch.

BACKGROUND OF THE INVENTION

To maximize the fuel efficiency of motor vehicles equipped with torque converters, it has been increasingly preferred to install a lock-up clutch which substantially rigidly engages the torque converter to positively prevent slippage of the torque converter. With regard to such motor vehicles, it was previously proposed in Japanese patent laid-open publication No. 5-262169 to compute a target output torque of the driven road wheels (axle torque) according to the current vehicle speed and the given throttle opening of the internal combustion engine of the vehicle, and to control the gear ratio of the power transmission system and the throttle opening of the engine so as to achieve the target output torque by taking into account the operating condition of the lock-up clutch.

A lock-up clutch is known to demonstrate partially engaged conditions involving varying degrees of slippage depending on the operating condition of the motor vehicle. However, this previously proposed control system is designed on the assumption that the lock-up clutch is either fully engaged or fully disengaged, and is therefore not capable of performing in an optimum fashion when the vehicle is operating under conditions in which the lock-up clutch is partially engaged in varying degrees.

BRIEF SUMMARY OF THE INVENTION

In view of such problems of the prior art, a primary object of the present invention is to provide a control system for controlling motor vehicles equipped with a power transmission system combining a torque converter and a lock-up clutch which can operate in an optimum fashion even when the lock-up clutch is partially engaged.

A second object of the present invention is to improve the previously proposed control system for controlling motor vehicles equipped with a power transmission system combining a torque converter and a lock-up clutch so that a significant improvement can be made in fuel economy.

According to the present invention, these and other objects can be accomplished by providing a control system for a motor vehicle including a power source, a power transmission system having a gear train of a variable gear ratio, and a torque converter, equipped with a lock-up clutch, connected between the power source and the power transmission system, comprising: capacity control means for changing a transmission capacity of the lock-up clutch according to a current operating condition of the motor vehicle; efficiency computing means for computing transmission efficiencies of the torque converter and the lock-up clutch according to the current operating condition of the motor vehicle; gear ratio computing means for computing an optimum gear ratio for achieving an optimum fuel economy under the current operating condition; and optimum gear ratio selecting means for selecting an optimum gear ratio according to results of computation by the efficiency computing means and the gear ratio computing means.

Thus, even when the lock-up clutch is only partially engaged, and therefore involves a certain amount of slippage, it is possible to accurately compute the optimum gear ratio that would minimize the fuel consumption under each combination of operating conditions by computing the current transmission efficiency of the lock-up clutch, and taking into account the current slip ratio of the torque converter. Typically, the torque converter consists of a fluid torque converter.

According to a preferred embodiment of the present invention, the transmission efficiency of the torque converter is determined from a transmission torque and a rotational speed of the torque converter, and the transmission efficiency of the lock-up clutch is determined by a value indicating an operating condition of the capacity control means. Preferably, the control system further comprises target drive force computing means for computing a target drive force value of power output control means of the power source according to the gear ratio selected by the optimum gear ratio selecting means, and the transmission efficiencies of the torque converter and the lock-up clutch. To optimize the operating condition of the vehicle, it is preferable if the transmission efficiency of the torque converter is determined by the efficiency computing means for a plurality of different drive forces.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
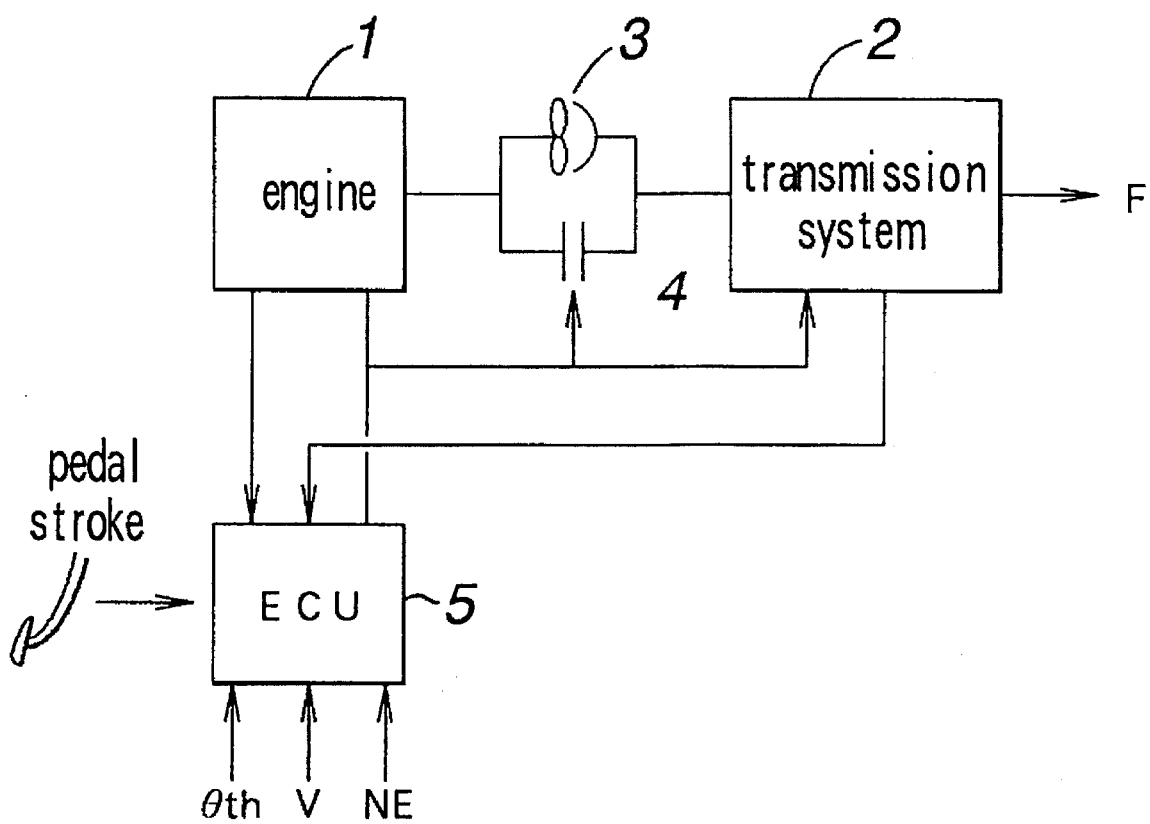
FIG. 1 is a schematic block diagram showing an essential part the motor vehicle to which the present invention is applied.

Referring to FIG. 1, the motor vehicle to which the present invention is applied comprises an internal combustion engine 1, a power transmission system 2, a torque converter 3, incorporated with a lock-up clutch, interposed between the output shaft of the engine 1 and the input shaft of the power transmission system 2, and an ECU 5 for producing control signals for controlling the fuel injection unit and the throttle control unit of the engine 1, a control unit for the lock-up clutch 4, and a control unit for changing the gear ratio of the power transmission system 2. The ECU 5 receives data signals indicating the operating conditions of the vehicle such as the accelerator pedal stroke, the throttle opening angle, the vehicle speed and the rotational speed of the engine. The torque converter 3 and the lock-up clutch 4 are connected in parallel with each other in the path of power transmission, and can therefore individually and jointly transmit torque between the engine 1 and the power transmission system 2.

Figure 2:
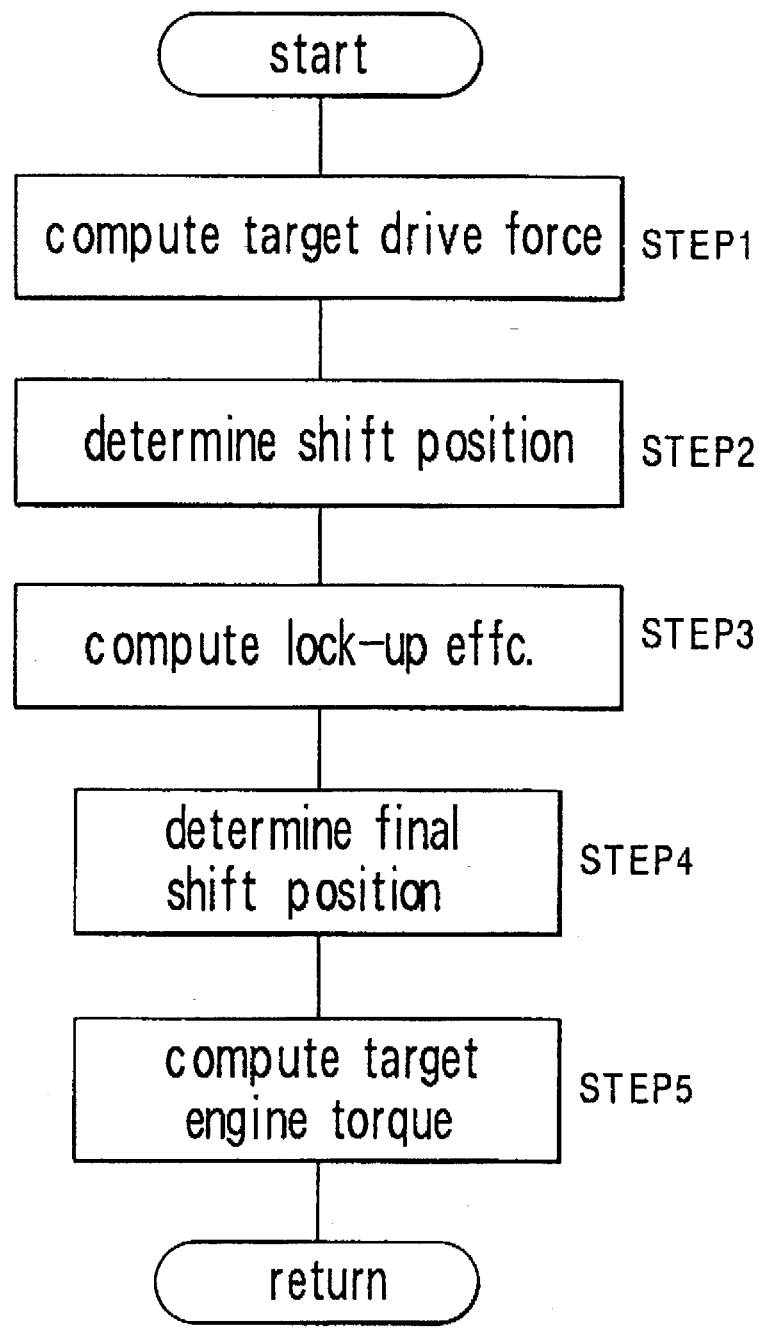
FIG. 2 is a flow chart showing the basic steps of computing various control signals according to the present invention.

The arithmetic computation unit of the ECU 5 conducts arithmetic operations as outlined in the flow chart of FIG. 2 to produce various control signals. First of all, a target drive force (traction) F is computed in step 1. The target drive force F is given as a mathematical function of the accelerator pedal stroke AP and the vehicle speed (rotational speed of the non-driven wheels) NV or given by $$F = F(AP, NV).$$

This mathematical function may be based on a simple algebraic formula or other sophisticated techniques such as the fuzzy estimation theory.

Figure 3:
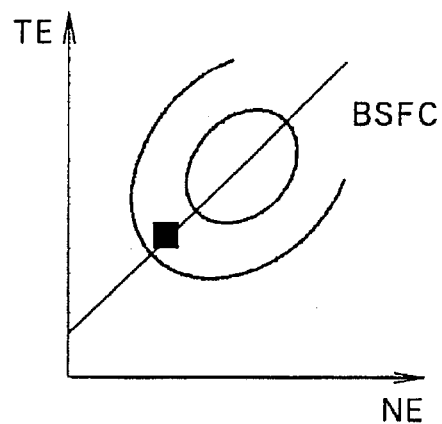
FIG. 3 is a graph showing the dependence of fuel consumption on the output torque TE and the rotational speed NE of the engine.

In step 2, the gear ratio or the shift position that would achieve an minimum fuel consumption under the current operating conditions is determined by taking into account the efficiency of the torque converter 3. Initially, by assuming that the slip ratio is substantially zero (as normally would be the case with the manual power transmission system), the optimum gear ratio is determined so as to satisfy the relationship between the engine torque and the engine rotational speed at the relevant point on the curve of optimum fuel consumption (BSFC) given in FIG. 3.

$$TE = TV/R$$

$$NE = NV \cdot R$$

$$F \cdot r = TV$$

where TE is the engine torque, TV is the drive shaft torque, R is the gear ratio, NE is the engine rotational speed, and r is the effective radius of the tires. The contour graph of FIG. 3 is drawn by connecting points of identical fuel consumption, and the curve of optimum fuel consumption (BSFC) which is given by low regions in the graph can be approximated by the following formula:

$$TE = a \cdot NE + b$$

where a and b are appropriately selected constants. Based on these relationships, the ideal gear ratio R can be expressed as follows:

$$TV/R = a \cdot NV \cdot R + b \text{ or}$$

$$a \cdot NV \cdot R^2 + b \cdot R - TV = 0. \text{ Therefore,}$$

$$R = \{(4a \cdot NV \cdot TV + b^2)^{1/2} - b\}/(2a \cdot NV)$$

In a vehicle engine control system using a fuel cut mode (F/C), the gear ratio R may be selected so that the fuel cut mode be preferentially selected during deceleration. Typically, the fuel cut mode involves an extremely lean condition or a total elimination of fuel supply. In other words, the gear ratio may be forced to a value which produces such a fuel cut condition. Thereby, a favorable fuel economy can be accomplished.

Then, the torque converter efficiency and the lock-up clutch efficiency are computed in the following steps. The values of the toque converter slip ratio etr (=BT/NE) at the shift position Sh which is closest to the ideal gear ratio R (based on the assumption that the slip ratio of the torque converter is zero) obtained from the above equation, and at the upper and lower adjacent shift positions Sh−1 and Sh+1 from an inverse map which is described hereinafter, and the shift position that will produce the optimum torque converter efficiency is determined by comparing the three values of the toque converter slip ratio. If the power transmission system is capable of changing the gear ratio in a continuous manner, the values of the toque converter slip ratio may be determined for the computed ideal gear ratio and at the upper and lower adjacent gear ratios which are higher and lower by a prescribed gear ratio increment $R_O$, respectively, so that the optimum gear ratio may be obtained by comparing the values of the toque converter slip ratio at these three different gear ratios either through a selection process or by interpolation. More specifically, $$Tpm = Tau \cdot (NE/1000)^2$$

$$TTR = Tpm \cdot k$$

$$TTR = (NE/1000)^2 \cdot Tau \cdot k$$

$$= \{NT/(NE/1000)\}^2 \cdot Tau \cdot k$$

$$TTR \cdot 10^6/NT^2 = Tau \cdot k/etr^2 = f(etr)$$

Hence, $etr = f^{-1}(TTR \cdot 10^6/NT^2)$ where Tpm is the pump absorption torque, Tau is the pump capacity, TTR is the torque converter transmission torque, k is the torque ratio, and NT is the pump rotational speed.

Figure 4:
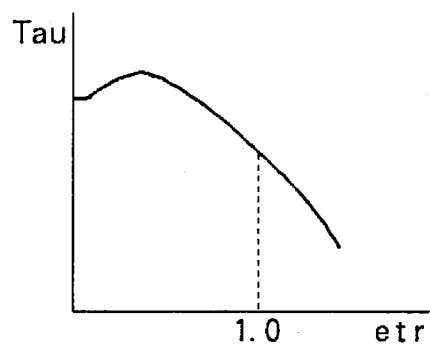
FIG. 4 is a graph showing the relationship between the slip ratio etr and the pump capacity Tau of the torque converter.
Figure 5:
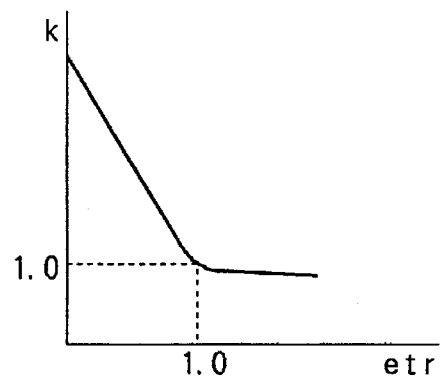
FIG. 5 is a graph showing the relationship between the slip ratio etr and the torque ratio k of the torque converter.
Figure 6:
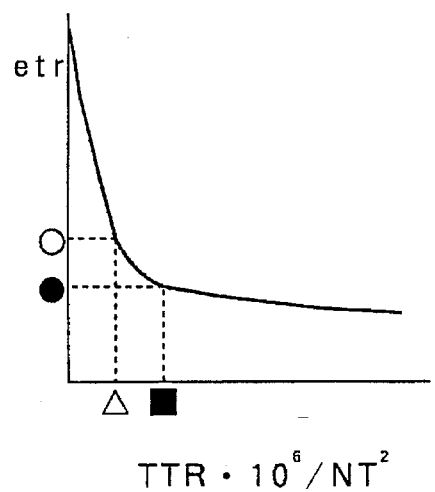
FIG. 6 is a graph showing the relationship between the slip ratio etr and $TTR \cdot 10^6/NT^2$ of the torque converter.

FIG. 4 shows the relationship between the pump capacity Tau and the torque converter slip ratio etr, FIG. 5 shows the relationship between the torque converter slip ratio etr and the torque ratio k, and FIG. 6 shows the relationship between the torque converter slip ratio etr and ($TTR \cdot 10^6/NT^2$). The torque converter slip ratio inverse map illustrated in FIG. 6 is thus obtained from the maps of Tau and k for etr so that the torque converter slip ratio etr can be readily obtained when the torque converter transmission torque TTR and the turbine rotational speed NT are given.

Following is an example of the procedure for computing the values of the torque converter slip ratio etr when the lock-up clutch 4 is "loose", "semi-tight" and "tight" according to the turbine torque TT and the turbine rotational speed NT at the downstream end of the torque converter 3 and the lock-up clutch 4. It is assumed that the lock-up clutch is controlled both by an on-off switching valve and a capacity control valve. The "loose" condition is produced when only the on-off switching valve is opened, and the torque converter supplements or makes up for the deficiency of the lock-up clutch. The "semi-tight" and "tight" conditions of the lock-up clutch are produced by partially and completely opening the capacity control valve, respectively, in addition to opening the on-off switching valve.

The relationships between the turbine torque TT, the lock-up clutch transmission torque TLC, and the torque converter transmission torque TTR are computed in the following manner.

(1) The pressure applied to the lock-up clutch 4 is computed from the throttle opening angle $\theta_{th}$.

$$PthB = PthB(\theta_{th})$$

(2) The lock-up clutch transmission torque TLC is computed from the pressure applied to the lock-up clutch 4.

$$TLC=TLC(PthB)$$

(3) The torque converter transmission torque TTR is computed from the lock-up clutch transmission torque TLC and the turbine torque TT.

$$TTR=TT-TLC$$

When the lock-up clutch 4 is tightly engaged, TTR<0, and the necessary torque is transmitted solely by the lock-up clutch.

$$TE=TLC=TT, \text{ and } NE-NT \text{ Hence, } etr=1.$$

When TTR≧0, etr is obtained from the torque converter inverse map (FIG. 6), or $$etr=f'(TTR \cdot 10^6/NT^2)$$

Figure 7:
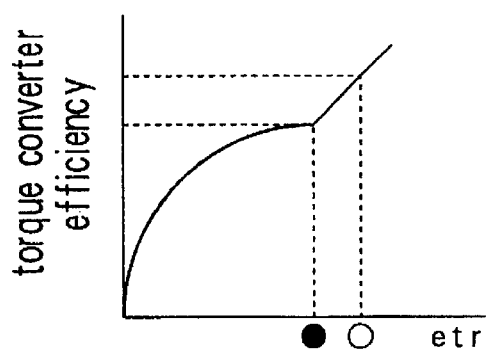
FIG. 7 is a graph showing the relationship between the slip ratio etr and the efficiency of the torque converter.

The mark "■" used in FIG. 3 indicates the ideal gear ratio R obtained from Equation (1), and the mark "Δ" used in FIG. 6 indicates the lower speed shift position or the higher gear ratio which is higher than the ideal gear ratio by one increment. The torque converter slip ratios corresponding to these gear ratios "■" and "Δ" are indicated by "●" and "○", respectively, in FIG. 6. The corresponding torque converter efficiencies are indicated in FIG. 7. In this particular case, in terms of the torque converter efficiency, the gear ratio which is one increment to the lower speed range from the ideal gear ratio is determined to be optimum.

Figure 8:
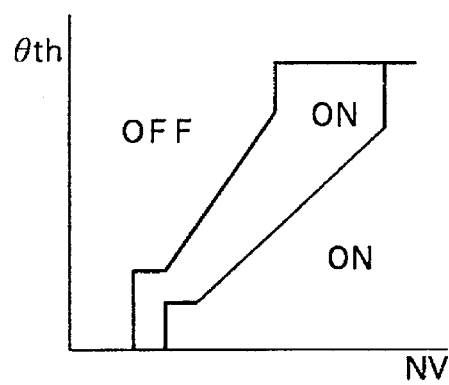
FIG. 8 is a graph showing the dependence of the state of the lock-up clutch on the throttle opening $\theta_{th}$ of the engine and the vehicle speed NV.
Figure 9:
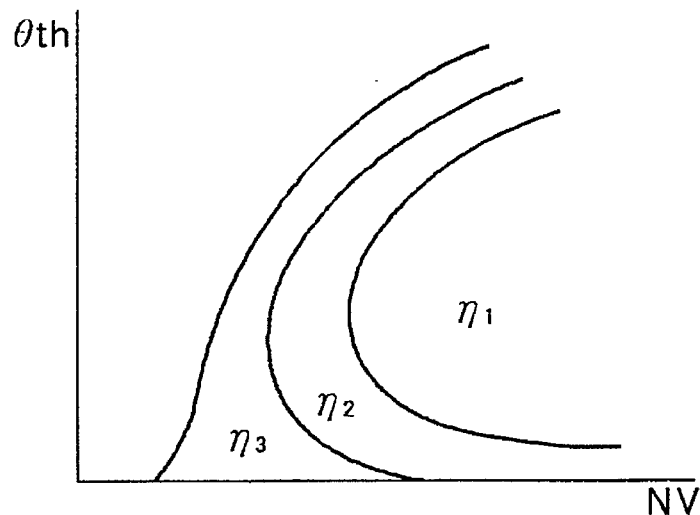
FIG. 9 is a graph showing the dependence of the lock-up clutch efficiency $\eta$ on the throttle opening $\theta_{th}$ of the engine and the vehicle speed NV.

In step 3, the lock-up clutch efficiency is computed. At this point, some explanation on the lock-up clutch transmission torque TLC may be in order. The possible conditions of the lock-up clutch are illustrated in FIG. 8. The condition of the lock-up clutch is determined by the lock-up clutch actuation signal produced from the arithmetic unit of the ECU, and the central and right hand side ON regions differ from each other in the condition of the capacity control valve, the right hand side ON region corresponding to a tighter engagement of the lock-up clutch. Thus, according to the lock-up clutch actuation signal, the actual lock-up clutch efficiency B is determined as illustrated in FIG. 9 in which $\eta_1$ and $\eta_2$ indicate the tight and semi-tight conditions of the lock-up clutch while $\eta_3$ indicates the loose condition of the lock-up clutch. According to the lock-up clutch efficiency, the actual lock-up clutch transmission torque TLC is determined. The slight discrepancy between the signals of FIG. 8 and the efficiencies of FIG. 9 is attributed to the insufficiency of the PthB pressure particularly in the smaller throttle opening angle side.

Figure 10:
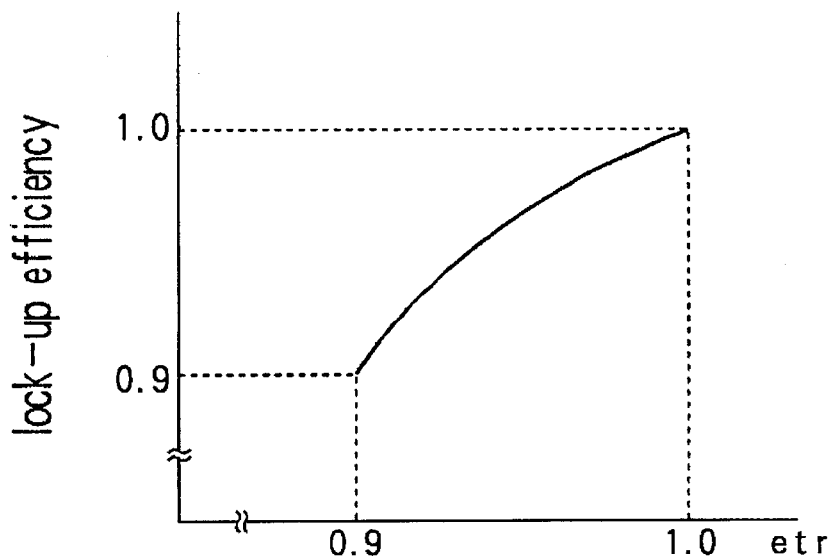
FIG. 10 is a graph showing the relationship between the slip ratio etr and the lock-up clutch efficiency $\eta$.

In step 4, the final shift position is determined. The relationship between the torque converter slip ratio etr and the lock-up clutch efficiency $\eta$ is shown in FIG. 10. In this particular case, the optimum gear ratio is determined to be the one which is one increment on the lower speed side from the ideal gear ratio R. Therefore, the values of the torque converter slip ratio etr at the shift position Sh corresponding to the ideal gear ratio R and at the shift positions which are immediately above and below this shift position (Sh+1 and Sh−1) from the inverse map are obtained from the inverse map, and one of the shift positions is selected which provides the optimum torque converter slip ratio etr and lock-up clutch efficiency $\eta$.

Figure 11:
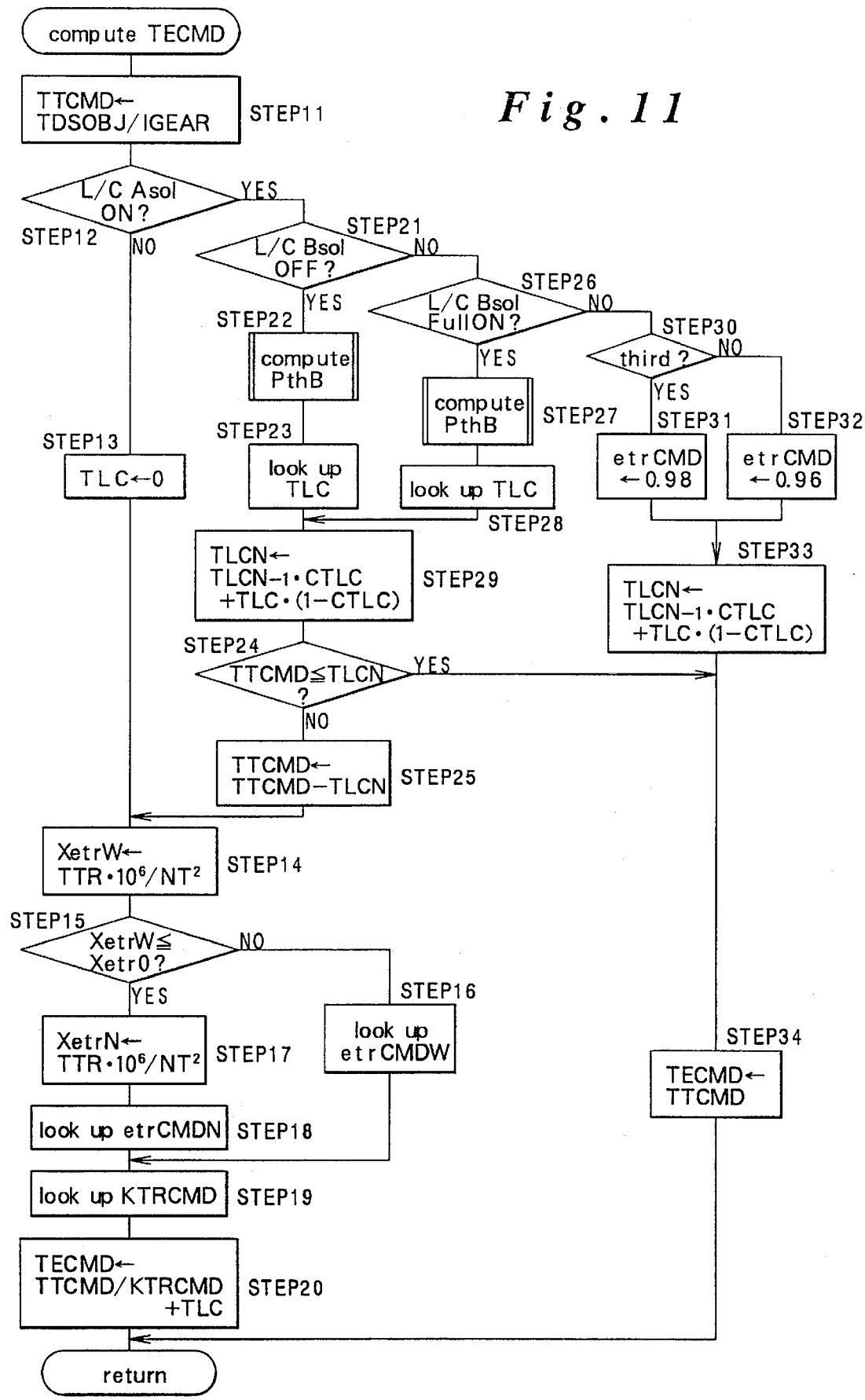
FIG. 11 is a flow chart showing the procedure for computing the target engine output torque.

In step 5, the target engine torque is computed. The target engine torque TECMD can be obtained according to the flow given in FIG. 11. First of all, the target engine torque TECMD is determined from the target drive shaft torque TDSOBJ, and the gear ratio IGEAR computed from the final shift position determined in step 4 (step 11). Then, it is determined if the on/off switching valve Aso1 of the lock-up clutch is on or off (step 12). If this valve is off, the lock-up clutch transmission torque TLC is reduced to zero as discussed earlier (step 13).

TTR·$10^6$/NT$^2$ is then substituted into XetrW (step 14), and the value of XetrW is compared with a prescribed value Xetr0. The value Xetr0 is a threshold value which determines which of two halves of the torque converter inversion map should be used depending on the magnitude of XetrW. If XetrW>Xetr0, as it means that the engine of the vehicle is idling or the vehicle is at a start up condition involving a low speed and a high engine torque, the first inversion map ertCMDW involving a larger range with coarser increments is selected so as to achieve a low torque converter slip ratio (step 16). Conversely, if XetrW<Xetr0, as it means that the vehicle is in a cruising condition involving a high speed and a low engine torque, the second inversion map ertCMDN involving a smaller range with fine increments is selected after substituting TTR·$10^6$/NT$^2$ is into XetrN (step 17) as it is likely that there are large changes in the torque converter slip ratio (step 18). By thus providing two different versions of the inverse map, it is possible to achieve both quick response and high accuracy.

Thereafter, the target torque ratio KTRCMD is looked up (step 19), and the target engine torque TECMD is computed as TTCMD/(KTRCMD+TLC) (step 20).

Figure 12:
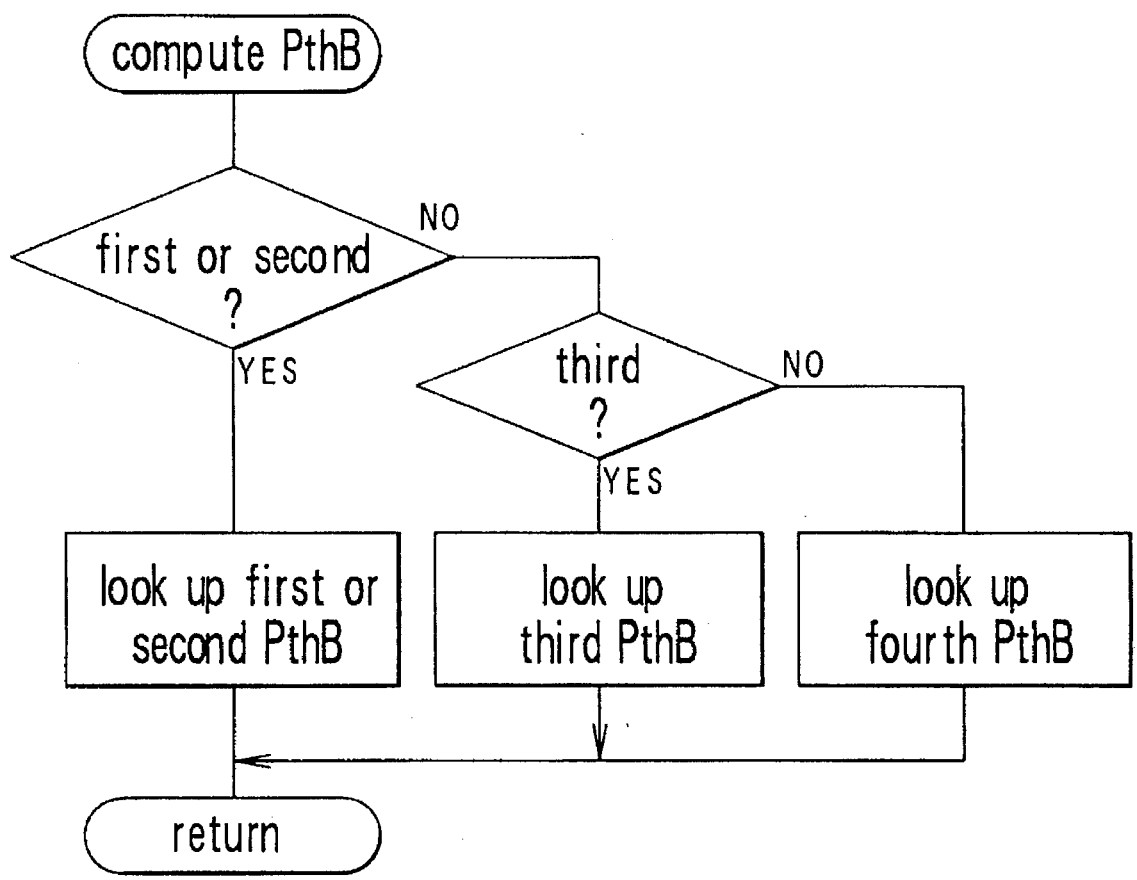
FIG. 12 is a flow chart showing the procedure for computing the pressure PthB that is to be applied to the lock-up clutch.

If Aso1 is on in step 12, as it means that TLC is not equal to zero, it is determined if the capacity control valve Bso1 is on or off (step 21). If Bso1 is off, the PthB pressure is computed for each of the shift positions according to the subroutine given in FIG. 12 (step 22). The lock-up clutch transmission torque TLC is looked up from the TLC-PthB pressure map (lock-up clutch being in the loose condition) (step 23). TLN is then adjusted and substituted by TLCN so as to account for a delay in the operation of the lock-up clutch (step 29). A lock-up clutch is known to demonstrate a certain time delay from the time a control signal is applied thereto and to the time the state of the lock-up clutch synchronizes with the control signal. To account for this delay, the lock-up clutch transmission torque TLC is treated as involving a first-order time delay. The modified lock-up clutch transmission torque TLCN is compared with the target turbine torque TTCMD (step 24). Thus, the transient behavior of the lock-up clutch is accurately accounted for, and it contributes to accurate determination of the engine torque.

The above described procedure corresponds to the procedure for computing the torque converter transmission torque TTR, and determines which of the two conditions is applicable depending on how the torque is transmitted by the torque converter 3 and the lock-up clutch 4. If it is determined that TTCMD≦TLC, it means that the lock-up clutch is tightly engaged. The lock-up clutch is otherwise under the loose condition or the semi-tight condition.

If a lock-up clutch loose or semi-tight condition (TTCMD>TLCN) is detected in step 24, the target turbine torque TTCMD is computed as TTCMD−TLCN (step 25), and the program flow advances to step 14. If Bso1 is detected to be on in step 21, it is determined if the lock-up clutch is in tight or semi-tight condition and if the condition mode for Bso1 is feedback control or leaned data control depending on if Bso1 is fully open or not (step 26). If Bso1 is determined to be fully open, the PthB pressure is computed for each shift position according to the subroutine given in FIG. 12 (step 27), an the lock-up clutch transmission torque TLC is looked up from the TLC-PthB pressure map for the lock-up tight and semi-tight conditions (step 28) before the program flow advances to steps 29 and 24.

If it is determined that Bso1 is not fully open in step 26, it means that the feedback control or the learned data control at the third or fourth shift position is currently in progress, and the current shift position is determined (step 30). If the third shift position is detected, the target torque converter slip ratio etrCMD is set to 0.98 (step 31). Otherwise, the target torque converter slip ratio etrCMD is set to 0.96 (step 32). This is because the control for keeping the lock-up clutch capacity TCL fixed will also keep the torque ratio fixed.

If the result of the determination step in step 24 is "yes", or steps 31 or 32 has been passed through, as it can be assumed that a smooth torque transmission without any slippage has been in progress substantially only with the lock-up clutch, TLN is then adjusted and substituted by TLCN in step 34, similarly as was done in step 29, the target engine torque TECMD is set to be equal to the target turbine torque TTCMD (step 34).

Thus, according to the present invention, it is possible to accurately estimate the torque transmission efficiency by accurately detecting the slip ratio of the torque converter and the engagement condition of the lock-up clutch. Therefore, it is possible to conform the actual drive force to the target drive force in a highly accurate manner, and a substantial gain can be achieved in saving fuel consumption of the engine.

Although the present invention has been described in terms of a preferred embodiment thereof, it is obvious to a person skilled in the art that various alterations and modifications are possible without departing from the scope of the present invention which is set forth in the appended claims.

What we claim is:

1. A control system for a motor vehicle including a power source, a power transmission system having a gear train of a variable gear ratio, and a torque converter, equipped with a lock-up clutch, connected between said power source and said power transmission system, comprising:

capacity control means for changing a transmission capacity of said lock-up clutch according to a current operating condition of said motor vehicle;

efficiency computing means for computing transmission efficiencies of said torque converter and said lock-up clutch according to said current operating condition of said motor vehicle;

gear ratio computing means for computing an optimum gear ratio for achieving an optimum fuel economy under said current operating condition; and optimum gear ratio selecting means for selecting an optimum gear ratio according to results of computation by said efficiency computing means and said gear ratio computing means.

2. A control system for a motor vehicle according to claim 1, wherein said torque converter consists of a fluid torque converter.

3. A control system for a motor vehicle according to claim 1, wherein said transmission efficiency of said torque converter is determined from a transmission torque and a rotational speed of said torque converter.

4. A control system for a motor vehicle according to claim 1, wherein said transmission efficiency of said lock-up clutch is determined by a value indicating an operating condition of said capacity control means.

5. A control system for a motor vehicle according to claim 1, further comprising target drive force computing means for computing a target drive force value of power output control means of said power source according to said gear ratio selected by said optimum gear ratio selecting means, and said transmission efficiencies of said torque converter and said lock-up clutch.

6. A control system for a motor vehicle according to claim 5, wherein said transmission efficiency of said torque converter is determined by said efficiency computing means for a plurality of different drive forces of said power source.

* * * * *